United States Patent [19]
Parker

[11] 4,197,275
[45] Apr. 8, 1980

[54] SILVER RECOVERY

[75] Inventor: Alan J. Parker, Floreat Park, Australia

[73] Assignee: Murdoch University, Murdoch, Australia

[21] Appl. No.: 937,702

[22] Filed: Aug. 29, 1978

[30] Foreign Application Priority Data

Aug. 29, 1977 [ZA] South Africa .................. 77/5210

[51] Int. Cl.$^2$ .............................................. C01G 5/00
[52] U.S. Cl. ................................... 423/34; 423/491
[58] Field of Search ................... 423/42, 34, 491; 260/607 D, 430; 75/118, 101 BE

[56]  References Cited
U.S. PATENT DOCUMENTS 3,880,732  4/1975  Sardisco .......................... 75/118

3,969,182  7/1976  Carlston .......................... 423/491

OTHER PUBLICATIONS

Alexander et al., "Solvation of Ions", *J.A.C.S.* 89:15, Jul. 19, 1967, pp. 3703-3712.
Jolly, *The Synthesis and Characteristic of Inorganic Compounds*, Prentice-Hall, Englewood Cliffs, N.J., 1970, pp. 97-104, 107-110, 113, 114.

*Primary Examiner*—Brian E. Hearn
*Attorney, Agent, or Firm*—Harness, Dickey & Pierce

[57]  ABSTRACT

Silver is refined or recovered by dissolving the silver in the form of chloride in dimethylsulfoxide in the presence of additional chloride salts, separating any insoluble salts and the precipitating silver chloride by the addition of water or methanol to the solution.

9 Claims, 1 Drawing Figure

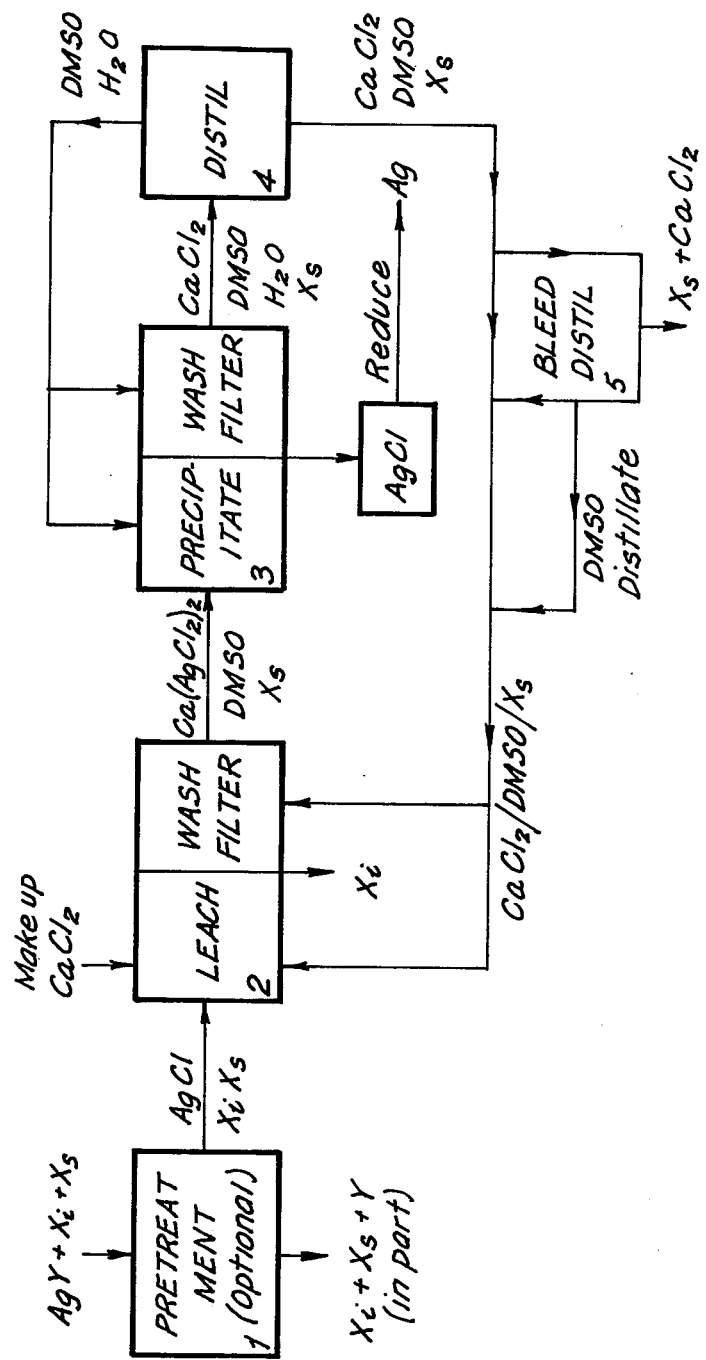

SILVER RECOVERY

This invention relates to the recovery or refining of silver and in particular to the recovery thereof in the form of silver chloride of high purity from which stage metallic silver can easily be obtained if required.

More particularly but not exclusively the invention relates to the recovery of silver from industrial, chemical and photographic residues which are rich in silver.

Sources of residual silver include, silver chloride (and bromide) mixed with paper, etc. as in the photographic industry. Gold refineries separate silver from gold by oxidising it i.e. by passing chlorine through molten gold containing silver and thus produces a cake of crude silver chloride. A certain waste "Slimes Process", after brine leaching, chlorination, and removal of soluble chlorides gives a residue which is about 50 percent silver chloride, together with intractable solids of little value.

Difficulties have been encountered in obtaining pure silver from the latter residue. The refinery product creates a chloride effluent problem and consumes zinc.

The conventional electrorefining of silver anodes has never been entirely satisfactory. Silver does not form a smooth adherent cathode, shorting of cells can occur, anodes must be bagged and a somewhat complex cell is used. Cooper is usually a contaminant in the cathodes and better than 99.95 percent silver is an exceptional product. Possibly the most serious objection is the slowness of the process, so that significant amounts of silver as anode, cathode and silver nitrate solution represent non-producing capital tied up in the tankhouse.

It is the object of this invention to provide an improved process for recovering or refining silver which will, in an easy manner, provide a relatively high purity silver chloride, or, if required, silver metal.

In accordance with this invention there is provided a process for the recovery or refining of silver comprising the steps of:
(a) if required, converting the silver to silver chloride;
(b) dissolving the silver chloride in dimethylsulfoxide in the presence of additional chloride salts such that the silver chloride dissolves as the dichloriargentate salt;
(c) separating any insoluble solids;
(d) precipitating purified silver chloride from the solution by admixture thereof with water or methanol; and
(e) separating the silver chloride from the solvent.

Further features of the invention provide for chloride to be converted to silver metal, if required, by, for example, heating and fluxing with sodium carbonate at 1100° C. or reducing with hydrogen at elevated temperatures or with zinc at ambient temperatures The further discussion and examplification of the invention will be directed towards the above defined process wherein water is the hydroxylic solvent but this is not to be interpreted as limiting the scope of the invention in any way. Also, where step (a) above is carried out Sodium Chloride (NaCl) and Calcium Chloride (CaCl$_2$) will be described as the preferred sources of chloride ions as a result, interalia, of their relatively low cost. It has been found that these salts are effective despite their low solubility in DMSO but NH$_4$Cl, LiCl and KCl are also effective.

It will be understood that the silver chloride dissolves in DMSO in the form $M^+(AgCl_2)^-$ where M is a metal equivalent. As will be understood from the above the preferred cations are calcium and sodium, which, when added in the form of a chloride also provide the required chloride ions.

The solubility of AgCl in DMSO is very low compared to the solubility of the dichloroargentate salts and in fact it is less soluble in DMSO than it is in water. The following tables 1, 2 and 3 show graphically the degree of conversion of AgCl to $AgCl_2^-$ in DMSO/H$_2$O mixtures.

TABLE 1

Solubility Constant $K_S2$ for AgCl (s) + Cl$^-$ ⇌ $AgCl_2^-$ in DMSO-H$_2$O Mixtures at 25° C., and Ionic Strength 0.1 M Formal.

| $c_{H_2O}$ M | DMSO[a] log $K_S2$ |
|---|---|
| <0.01 | 1.454 |
| 0.03 | 1.428 |
| 0.07 | 1.391 |
| 0.55 | 1.223 |
| 5.55 | 0.033 |
| 13.87 | −1.38 |
| 27.75 | −2.05 |
| 41.63 | −1.94 |
| 55.5 | −4.7 |

TABLE 2

Solubility of Silver Chloride in DMSO Saturated with Calcium Chloride. Effect of Adding Water to Solutions of DMSO Saturated with Ca(AgCl$_2$)$_2$ at 25° C.

| Water added ml | Solution volume ml | mol % DMSO | [Ca$^{2+}$] M | [AgCl$_2^-$] M | [Silver][b] g/l |
|---|---|---|---|---|---|
| 0 | 100 | 79[a] | 1.40 | 1.75 | 189 |
| 2.5 | 102.5 | 73 | 1.40 | 1.46 | 158 |
| 5.0 | 105 | 68 | 1.40 | 1.17 | 126 |
| 8.0 | 108 | 63 | 1.35 | 0.899 | 96 |
| 11.0 | 111 | 59 | 1.30 | 0.620 | 67 |
| 15.0 | 115 | 54 | 1.30 | 0.426 | 46 |
| 20.0 | 120 | 49 | 1.30 | 0.259 | 28 |
| 30.0 | 130 | 41 | 1.25 | 0.095 | 10.3 |
| 40.0 | 140 | 35 | 1.12 | 0.035 | 3.8 |
| 50.0 | 150 | 31 | 1.05 | 0.020 | 2.2[b] |
| 70.0 | 170 | 25 | 0.90 | 0.006 | 0.68[b] |
| 100.0 | 200 | 19 | 0.72 | 0.003 | 0.29[b] |

[a]Solution contained water introduced as CaCl$_2$ . 2H$_2$O. Water estimated by Karl Fischer titration.
[b]Total soluble silver.

TABLE 3

Solubility of Silver Chloride in DMSO and in DMSO-H$_2$O Saturated with Sodium Chloride at 25° C.

| Vol % DMSO ml | Mole % DMSO | [AgCl$_2^-$] M | [Silver][a] g/l |
|---|---|---|---|
| 100 | 100 | 0.417 | 45 |
| 99 | 96 | 0.370 | 40 |
| 97 | 88 | 0.315 | 34 |
| 95 | 81 | 0.278 | 30 |
| 93 | 75 | 0.241 | 26 |
| 90 | 68 | 0.190 | 20.5 |

[a]Total soluble silver.

As will be clear to those skilled in the art from the tables, the test was conducted by providing a fixed concentration of chloride ions with excess silver chloride in a number of different Water/DMSO mixtures. As will be seen from the tables almost complete conversion to the dichloroargentate anion was obtained in pure DMSO with the chloride concentration at 1 M. It will be clear from a study of the tables that the invention need not be practiced using pure DMSO but could be practiced by using a DMSO/H$_2$O mixture initially (preferably having a low water content) and thereafter adding water to cause silver chloride to precipitate out. Obviously the water content of the DMSO used initially will determine the yield but in the commerical application of the invention the cost of removing water from the DMSO (which will clearly be recycled) will determine the practical water content of the DMSO used to dissolve the silver chloride in step (b) defined above.

It will be understood that the solubility of the dichloroargentate in DMSO will be affected by the nature of the cations present (see Table 4) and these should be chosen to provide optimum results in relation to the cost thereof.

TABLE 4

Solubilities of Metal Chlorides in Dimethylsulfoxide at 35° C.

| Salt[d] | Solubility moles litre$^{-1}$ | Salt[d] | Solubility moles litre$^{-1}$ |
|---|---|---|---|
| LiCl | 2.8[d] | CdCl$_2$ . 2H$_2$O | 2.2 |
| NaCl | 0.2 | ZnCl$_2$ | >3.2[c,d] |
| KCl | <0.01 | CaCl$_2$ . 2H$_2$O | 1.3[d] |
| NH$_4$Cl | 2.2 | FeCl$_3$ . 6H$_2$O | 1.1 |
| PbCl$_2$ | 0.36 | FeCl$_2$ . 4H$_2$O | 2.7 |
| MgCl$_2$ . 6H$_2$O | 0.83 | NiCl$_2$ . 6H$_2$O | 0.7 |
| SnCl$_2$ . 2H$_2$O[b] | >4.2[d] | MnCl$_2$ . 4H$_2$O | 2.7 |

[a]The water content of the salts was as shown when added to the DMSO, but the solid phase in contact with the saturated solution is a DMSO-water solvate for divalent cation salts.
[b]Reduces DMSO to dimethyl sulfide.
[c]Highly exothermic dissolution.
[d]Very viscous solutions.

Also the solubility increases at elevated temperatures and the rate of dissolution also increases with temperature.

Table 1 shows values of log K$_{S2}$ in DMSO-water mixtures and low ionic strength. Concentrations of silver and calcium, which remain in solution, as water is added to a saturated solution of Ca(AgCl$_2$)$_2$ in 0.79 mole fraction DMSO are in Table 2. Concentrations of NaAgCl$_2$ in DMSO-water mixtures in the presence of excess AgCl and NaCl are in Table 3. Small amounts of water drastically reduce the amount of silver in solution.

Since the process recycles the dried DMSO/CaCl$_2$ to dissolve more AgCl, silver chloride is not lost, even if the recycling solutions contain some dissolved silver chloride. Thus one should add sufficient water such as to optimise five interdependent factors: low solution volume for filtration and distillation, low water which must be recovered by distillation, high recovery of silver chloride per cycle, negligible precipitation of other chlorides such as of lead, and acceptable filterability of the sliver chloride. The addition of 30–40 ml of water per 100 ml of Ca(AgCl$_2$)$_2$ in dry DMSO, such as to produce 25–35% by volume water in the solution, satisfies the above requirements.

After precipitating silver chloride from concentrated Ca(AgCl$_2$)$_2$ solutions by adding water to DMSO, the DMSO/CaCl$_2$.H$_2$O filtrate has to be freed of nearly all of its water so that dry DMSO/CaCl$_2$ can be recycled to dissolve more silver chloride. This is achieved by distilling water from the high boiling (b.p. 189°) DMSO. The DMSO-H$_2$O distillate is used as AgCl precipitating agent. Distillation is at low pressure and temperature (100°–120° C. at 0.95 kg/cm$^2$) to avoid decomposition of DMSO. Virtually all the water and some DMSO is readily distilled from 50 vol. % H$_2$O in DMSO containing 0.5 M CaCl$_2$ at 100°–120° C. at 0.95 kg/cm$^2$. A little calcium chloride precipitated after the solution colume had been reduced by 65%. The DMSO/CaCl$_2$ solution then contained 3.0 g/l water, which is much drier than the DMSO solution prepared initially by dissolving 1.2 M CaCl$_2$.2H$_2$O in dry DMSO. As expected, the recycling solution, being drier, dissolved more AgCl (2 M) than the initial solution, when stirred with excess silver chloride. Quite satisfactory results are obtained even if the bottoms contain 2–4 M water.

The various aspects of the invention will be more clearly understood by reference to the following description of experiments conducted on silver containing materials.

EXPERIMENT 1 a residue from a platinum group metal recovery process, was treated according to the invention the mixture being obtained after acid brine leaching, chlorination, then brine leaching of an anode slimes from a copper refinery. It contained 38.8 percent silver, all as silver chloride, plus 13 percent by weight of a tarry organic material, soluble in DMSO and acetone. This presumably resulted from tankhouse additives which had been chlorinated. It was desirable that this be removed prior to leaching AgCl, because, like AgCl, it is precipitated from DMSO by addition of water, and it would otherwise interfere with the filtering characteristics of Ca(AgCl$_2$)$_2$/DMSO solutions. It was easily removed by burning it out with a bunsen, but this did reduce some AgCl to silver metal, which is insoluble in CaCl$_2$/DMSO. It could also be removed by washing with chloride-free DMSO, and partly removed by washing with acetone. It may however, not be necessary to remove such organics, when silver metal is the required product, but leave them with the AgCl throughout the process, relying on their ultimate removal when the AgCl is fired with Na$_2$CO$_3$. However, removal in a pretreatment seems to be generally desirable. 75.0 g of dry residue as above outlined was washed with 200 ml of acetone, then 100 ml of DMSO to remove the tarry organics. The residue still gave brown DMSO washings. Dry weight was 66.3 g. This treated residue was stirred for 15 minutes at 60° to 80° C. with 400 ml of laboratory grade DMSO containing 65 g of 60 to 80 percent CaCl$_2$ (containing XH$_2$O, X < 6). A filter aid was added, the solution was filtered through a dry precoated sinter into a dry filter flask. The residue (30 g) was washed with dry DMSO (50 ml) and contained 0.24 percent of the silver. The brown filtrate was diluted with 250 ml H$_2$O to give a total volume of 700 ml (36 percent by volume H$_2$O). A readily filterable precipitate of fawn coloured AgCl was formed. Decantation rather than total filtration was easily achieved. It was filtered, washed with acetone, water, then acetone to give 36.2 g of AgCl, plus a little of the organics.

The dry solid was redissolved in 400 ml DMSO+50 g CaCl$_2$. XH$_2$O, at 80° over 15 minutes. It was filtered, (filter aid) and 150 ml H$_2$O was added to the filtrate to give 31.2 g AgCl.

All filtrates (1250 ml) were diluted with a further 150 ml of H$_2$O to give a further 5.8g of solids containing AgCl and a little of the organics, as evidenced by washing with DMSO to give a brown solution. The total recovery of AgCl was 36.5g (88 percent).

The twice refined AgCl (31.2g) was melted with Na₂CO₃ at 1000° C. to give a silver button the analysis of which is set out in Table 5. The only serious impurity was antimony.

The DMSO-H₂O filtrates were distilled at 1 atmosphere to remove acetone and water. Distillate was obtained continuously in the range 95° to 168° C. This is characteristic of DMSO/H₂O mixtures. Relatively pure DMSO was obtained in the range of 150° to 168° C. by distillation but it smelt of dimethylsulphide. An extremely viscous residue presumably $CaCl_2 \cdot XH_2O \cdot DMSO$, remained. This viscous residue dissolved AgCl to the extent of 13 g/l without addition of further dry $CaCl_2$. For future work, distillation of DMSO/H₂O under reduced pressure (1 to 5 mm) was considered desirable.

EXPERIMENT 2

A residue from a process for removing silver from gold by blowing with chlorine and obtained as a block of AgCl which had solidified from a melt was tested. It was ground to −100 mesh. Pretreatment involved washing with water to remove water soluble chlorides. A major component was copper (I) chloride, which is only sparingly soluble in water. Copper (I) chloride can be washed out as $NACuCl_2$, with hot brine, oxidised to soluble $CuCl_2$ with $NaClO_3$ or dissolved in water containing 10 percent by volume acetonitrile. The latter variant was used in this experiment. Evaporation of the acetonitrile/water azeotrope precipitated high purity copper (I) chloride, or copper oxychloride which are premium chemicals.

20 g of the crude AgCl was washed with warm 60° to 80° water (100 ml) containing 15 ml acetonitrile. The residue weighted 14.8 g. Distillation of acetonitrile from the washings precipitated 1.2 g of a pale green powder which darkened on exposure to air. The dry residue was dissolved in 250 ml DMSO plus 25 g dry $CaCl_2 \cdot XH_2O$ at 25° over 10 minutes. Filtration left less than 1 g residue. Addition of water (100 ml) to the filtrate precipitated 13.2 g AgCl. This was fluxed and melted with sodium carbonate to give a silver button, having the analysis shown in Table 1.

A COMPARISON OF SOLVENTS AND CHLORIDES IN THEIR ABILITY TO DISSOLVE SILVER CHLORIDE was then conducted as follows:

Silver chloride was shaken at 60° to 80° for 10 minutes with excess NaCl or $CaCl_2$ in DMF (dimethylformamide) or DMSO (100 ml). The solution was decanted, excess water was added and the precipitated AgCl was collected, dried and weighed. The results are summarized as follows:

(a) NaCl/DMSO - AR grade NaCl dissolved 48 g AgCl/liter DMSO
(b) $CaCl_1$/DMF - $CaCl_2 \cdot XH_2O$ (60 to 80 percent $CaCl_2$) in DMF dissolved 78 g AgCl/liter DMF
(c) NaCl/DMF - NaCl in DMF dissolved 27 g AgCl/liter DMF
(d) $CaCl_2$/DMSO - $CaCl_2 \cdot XH_2O$ (60 to 80 percent $CaCl_2$) dissolved 86 g AgCl/liter DMSO

TABLE 5

| Element | AgCl in Experiment 1 after one dissolution in DMSO p.p.m. (approx.) | Ag Product from Experiment 1 p.p.m. | Ag Product from Experiment 2 p.p.m. | Typical Ag cathode from electrolytic process p.p.m. |
|---|---|---|---|---|
| As | 5 | ND | ND | |
| Au | 10 | <30 | <30 | 2 to 4 |
| Bi | — | <1 | <1 | |
| Cu | 5 | <1 | <1 | 30 to 40 |
| Fe | — | <3 | <3 | 0 to 10 |
| Ni | 5 | <1 | <1 | |
| Pb | 10 to 100 | <1 | <1 | 10 to 20 |
| Pd | 10 | <10 | <10 | |
| Pt | 5 | <10 | <10 | |
| Rh | — | <3 | <3 | |
| Sb | 10 to 20 | 65 | <3 | |
| Te | 10 to 100 | <10 | <10 | |
| Ca | 10 to 100 | — | — | |
| Si | 10 to 20 | — | — | |
| Sn | 10 to 20 | — | — | |
| Zn | 5 | — | — | 0 to 10 |
| Ag | 74.2% | — | — | |

(< = less than)

A proposed complete process is outlined with reference to the accompanying drawing which is a flow diagram of an envisaged commercial plant. In the flow diagram the various constituents are conducted as follows:

Ag Y=material containing silver (including alloys)
Xi=insolubles (in DMSO)
Xs=solubles (in DMSO)
MCl=NaCl or $CaCl_2 \cdot XH_2O$ In step 1 the feed material is subjected to pretreatment which includes conversion of the slver to silver chloride and also the previous burning off of organic materials as this is required.

At step 2 the material is leached with DMSO, washed and filtered.

The solution is then treated with water at step 3 to precipitate silver chloride which is filtered off and either retreated in the same way or sent to a furnace 4 to form silver metal. The filtrate from step 3 is distilled at 5 and the light fraction is returned via to the water step 3. The bottom fraction is returned to the leach step 2. A bleed stream will be necessary to control soluble impurities.

We claim:

1. A process for the recovery or refining of silver comprising the steps of:
   (a) ensuring that the silver is in the form of silver chloride;
   (b) dissolving the silver chloride in dimethylsulfoxide in the presence of additional metal or ammonium chloride salts such that the silver chloride dissolves as the dichloroagentate salt;
   (c) separating any insoluble solids;
   (d) precipitating purified silver chloride from solution by the addition of water or methanol; and
   (e) separating the silver chloride precipitate.

2. A process as claimed in claim 1 where a dimethylsulfoxide/water mixture is used in place of the dimethylsulfoxide in step (b).

3. A process as claimed in claim 2 wherein the mixture contains not more than 3 grams/liter of water.

4. A process as claimed in claims 1,2 or 3 wherein the said additional chloride salts are sodium chloride or calcium chloride.

5. A process as claimed in claim 4 wherein the amount of water added to precipitate the silver chloride is selected to optimise the following factors, low solution volume for filtration and distillation, low water which must be recovered by distillation, high recovery of silver chloride, negligible precipitation of other chlorides and acceptable filterability of the silver chloride.

6. A process as claimed in claim 5 wherein the amount of water is 30–40 ml per 100 ml of $CaAgCl_2$ is dry DMSO to produce 25–35% by volume of water in the solution.

7. A process as claimed in claims 1, 2 or 3 wherein the said additional chloride salts are ammonium chloride, potassium chloride or lithium chloride.

8. A process as claimed in claim 7 wherein the amount of water added to precipitate the silver chloride is selected to optimise the following factors, low solution volume for filtration and distillation, low water which must be recovered by distillation, high recovery of silver chloride, negligible precipitation of other chlorides and acceptable filterability of the silver chloride.

9. A process as claimed in claim 8 wherein the amount of water is 30–40 ml per 100 ml of $CaAgCl_2$ in dry DMSO to produce 25–35% by volume of water in the solution.

* * * * *